United States Patent
Sutton et al.

(10) Patent No.: US 12,450,906 B2
(45) Date of Patent: Oct. 21, 2025

(54) SYSTEM AND METHOD FOR TAGGING UNTAGGED EVENTS

(71) Applicant: Verint Americas Inc, Alpharetta, GA (US)

(72) Inventors: Michael Sutton, Petah Tikva (IL); Zvi Figov, Modiin (IL); Nir Naor, Ramat Hasharon (IL)

(73) Assignee: Verint Americas Inc., Alpharetta, GA (US)

( * ) Notice: Subject to any disclaimer, the term of this patent is extended or adjusted under 35 U.S.C. 154(b) by 354 days.

(21) Appl. No.: 18/161,476

(22) Filed: Jan. 30, 2023

(65) Prior Publication Data
US 2024/0257517 A1 Aug. 1, 2024

(51) Int. Cl.
| | | |
|---|---|---|
| G06K 9/00 | (2022.01) | |
| G06F 16/78 | (2019.01) | |
| G06V 10/774 | (2022.01) | |
| G06V 20/40 | (2022.01) | |

(52) U.S. Cl.
CPC .......... *G06V 20/44* (2022.01); *G06F 16/7867* (2019.01); *G06V 10/774* (2022.01)

(58) Field of Classification Search
CPC ........ G06V 20/46; G06V 20/48; G06V 20/52; G06V 20/00; G06V 20/44; G06V 10/774; G06T 2207/30241; G08B 13/19645; G06F 16/7867
See application file for complete search history.

(56) References Cited

U.S. PATENT DOCUMENTS

| | | | | |
|---|---|---|---|---|
| 11,353,327 | B2* | 6/2022 | Chander | G01C 21/3484 |
| 2019/0043207 | A1* | 2/2019 | Carranza | G06V 20/52 |
| 2021/0056713 | A1* | 2/2021 | Rangesh | G01S 17/89 |
| 2022/0004775 | A1* | 1/2022 | Flick | G06V 40/20 |
| 2023/0177804 | A1* | 6/2023 | Wuu | G06V 20/588 382/103 |
| 2023/0339431 | A1* | 10/2023 | Kuehner | B60R 25/305 |

OTHER PUBLICATIONS

Styles, Olly, Tanaya Guha, and Victor Sanchez. "Multi-camera trajectory forecasting with trajectory tensors." IEEE Transactions on Pattern Analysis and Machine Intelligence 44.11 (2021): 8482-8491. (Year: 2021).*

* cited by examiner

*Primary Examiner* — Avinash Yentrapati
(74) *Attorney, Agent, or Firm* — Dinsmore & Shohl LLP

(57) ABSTRACT

A tagging system gathers all events (tagged and untagged) generated by remote sensors at a location or facility over time. Based on the gathered events the tagging system uses machine learning to train a model to learn the sensor layout of a facility or location and the timing between the triggering of sensors. Once trained, the model can predict the movement and location of individuals and objects throughout the facility based on a starting tagged event. Given a series of tagged and untagged events, the system can use the movement predictions of the model to tag the untagged events in the series with the identification of an individual or object that triggered the generation of the untagged event.

20 Claims, 8 Drawing Sheets

SYSTEM AND METHOD FOR TAGGING UNTAGGED EVENTS

FIELD

The present disclosure is directed to training a model to predict untagged events in a security information management system and labeling actual untagged events based on the prediction.

BACKGROUND

Security information management systems have long used remote sensors (e.g., temperature sensors, HVAC sensors, video surveillance, access control sensors, motion detection sensors, etc.) to gain insight to the conditions in a specific area or facility. Some of these sensors (e.g., access control sensors, video surveillance with facial and object recognition) may be used to identify the individual or object triggering the sensor (e.g., opening a door with a user ID card or an RFID tag passing an RFID reader, etc.). However, many of these sensors are passive sensors (e.g., temperature sensors, HVAC sensors, motion detection sensors, etc.) that provide no additional insight into the person or object that triggered the sensor and therefore provide no additional insight as to the movement or location of individuals or objects.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, according to certain embodiments a method is disclosed that includes receiving a first set of tagged events as a first set of tagged data sets and a second set untagged events as a first set of untagged data sets from a set of sensors in a sensor system. The method includes transmitting the first set of tagged data sets and the first set of untagged data sets from the sensor system to a tagging system. The method includes generating, by a training preprocessing component, one or more training data sets from the first set of tagged data sets and the first set of untagged data sets. The method includes training, by a causality modeling component, an event prediction model with the one or more training data sets. The method includes receiving a second set of tagged events as a second set of tagged data sets and a second set of untagged events as a second set of untagged data sets at a tagging application preprocessing component. The method includes generating, by the tagging application preprocessing component, one or more data set groupings from the second set of tagged data sets and the second set of untagged data sets. The method includes applying, by the causality modeling component, the trained event prediction model to each second tagged data set in the data set grouping. The method includes generating, by the trained event prediction model, one or more predicted events for each second tagged data set in the data set grouping. The method includes receiving the data set grouping and the one or more predicted events for each second tagged data set at a tagging component. The method includes comparing, by the tagging component, each predicted event to each second tagged data set received to identify matching predicted events and second tagged data sets. The method includes tagging one or more second untagged data set by assigning an identification tag associated with the predicted event to the second tagged data set when the second untagged data set and the predicted event are identified as matching.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The objects and advantages will appear more fully from the following detailed description made in conjunction with the accompanying drawings.

BRIEF DESCRIPTION OF THE DRAWING(S)

DETAILED DESCRIPTION

Figure 1A:
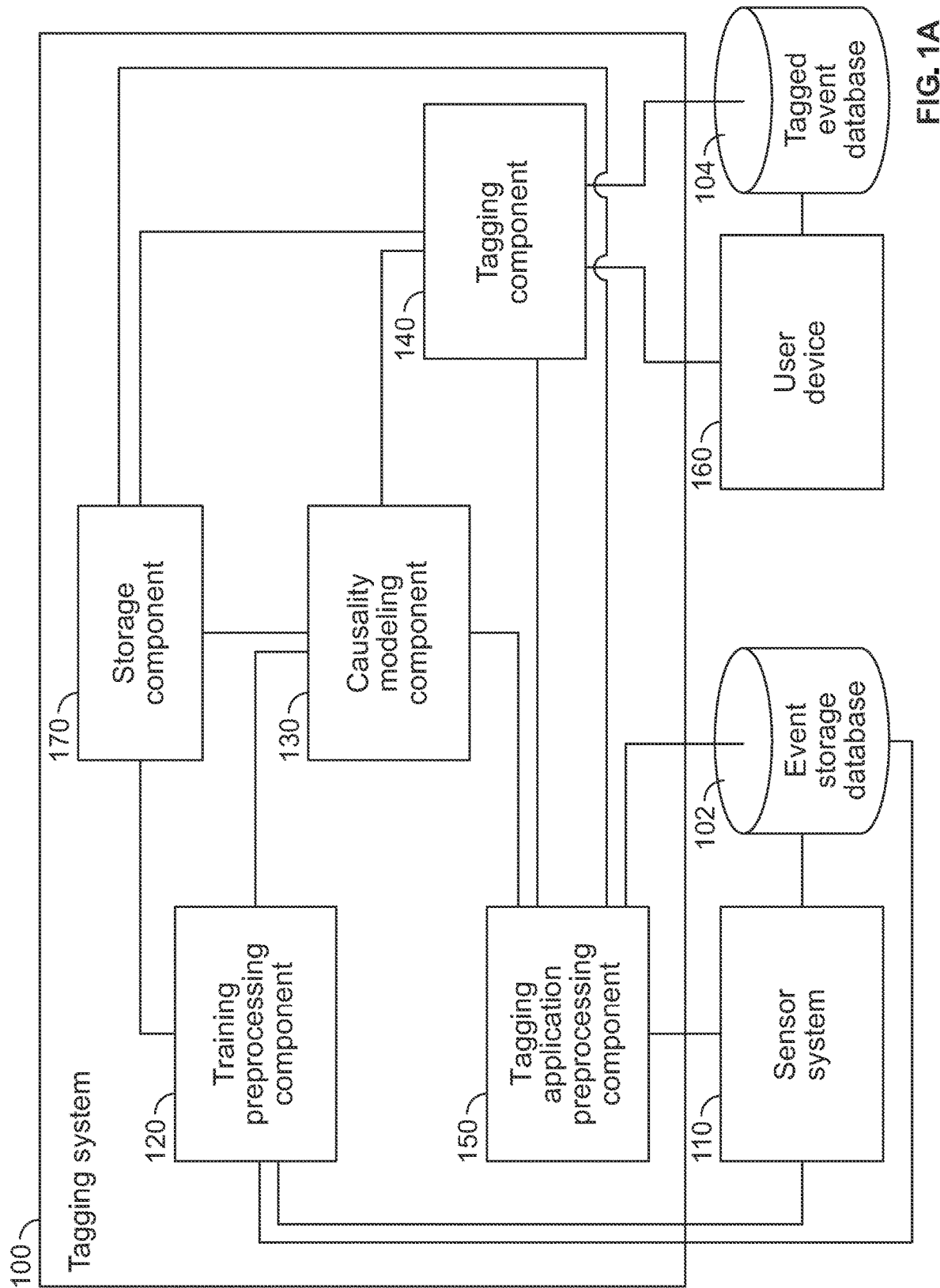
FIG. 1A illustrates an example of a system for predicting events in a security information management system and tagging detected untagged events, according to certain embodiments.

In the present description, certain terms have been used for brevity, clearness, and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claims. Any other dimensions and materials not consistent with the purpose of the present application can also be used. Various equivalents, alternatives, and modifications are possible within the scope of the appended claims.

As indicated above, security information management systems utilize many remote sensors (e.g., temperature sensors, HVAC sensors, video surveillance, access control sensors, motion detection sensors, RFID sensors, etc.) to gain insight to the conditions in a specific area or facility. For companies and organizations looking to maximize situational awareness in a location or facility it would be beneficial to use the remote sensors of the security information management system to track the location and/or movement of individuals and/or objects. When a remote sensor is triggered throughout the location and/or facility with a security information management system, the sensor generates an event. The security information management system can use the generated events to track the location and/or movement of individuals and/or objects throughout the facility or location.

However, only some remote sensors (e.g., access control sensors, RFID sensors, video surveillance sensors with item and/or facial recognition) are capable of producing tagged events (e.g., events that include the identification of an individual or object that caused the event). Many of the remote sensors (e.g., motion detection sensors, temperature sensors, video surveillance without object or facial recognition) are passive sensors that only generate untagged events (events that do not include the identification of the individual or object that caused the event). Accordingly, a security information management system that tracks the location and/or movement of individuals can only do so for based on tagged events, this creates an incomplete representation of the situational awareness at a facility or location at the points in between sensors that produce tagged events.

To provide a more complete understanding of the location and movement of people and objects at a facility or location, there is an unmet need in the art for a system that can identify an individual or object that triggered a sensor to generate an untagged event. In other words, there is a need for a system that can use machine learning to tag untagged events generated by sensors in a security management system. In addition to creating a more complete understanding of the location and movement of individuals and/or objects across a facility and/or location, the capability for a system to tag untagged events will allow for enhanced location of individuals in the case of an emergency. Further, the learned route data and travel times can be analyzed to determine facility and location layout inefficiencies.

A tagging system gathers all events (tagged and untagged) generated by remote sensors at a location or facility over time. Based on the gathered events the tagging system uses machine learning to train a model to learn the sensor layout of a facility or location and the timing between the triggering of sensors. Once trained, the model can predict the movement and location of individuals and objects throughout the facility based on a starting tagged event. Given a series of tagged and untagged events, the system can use the movement predictions of the model to tag the untagged events in the series with the identification of an individual or object that triggered the generation of the untagged event.

For context, a facility or location may include numerous paths for individuals and or objects to travel between different areas throughout the facility or location. The different areas and paths may have any number of sensors (e.g., temperature sensors, HVAC sensors, video surveillance, access control sensors, motion detection sensors, RFID sensors, etc.) distributed throughout the facility or location. When a sensor is triggered (image is picked up on video surveillance, ID is swiped/entered into access control sensor, motion is detected by a motion sensor, temperature from a temperature sensor changes, etc.) the sensor generates an event which may be processed and stored by the security management system.

Events generated by a multi-mode sensor system within the information security system may fall into two categories: tagged events and untagged events. Tagged events inherently include the identity of the individual or object causing the sensor to generate the event. As non-limiting examples, tagged events include, but are not limited to, an individual access badge being scanned at a security station, object radiofrequency ID being pinged by an RFID sensor, an individual being identified on-camera by facial recognition, or an individual's access code being used to activate an elevator are all examples of tagged events. Tagged events provide a definite location of the specific individual or object (e.g., the location of the sensor) at a specific time.

By contrast, untagged events merely indicate that someone or something has caused a sensor to trigger an event at a specific location at a specific time. Untagged events do not provide the identification of a specific individual or object causing the event, either due to the nature of the sensor (e.g., a simple motion sensor has no ability to determine the identity of the object or individual triggering the sensor) or the circumstances surrounding the event (e.g., a video surveillance sensor with object and facial recognition that is unable to make a positive identification of the object or individual causing the sensor to be triggered). Additional non-limiting examples of untriggered events include, but are not limited to, triggering a motion or pressure sensor, opening a door with an attached alarm, the temperature in an area changing when a person or object is positioned near a temperature sensor.

A series of events over time indicate movement and/or positions of individuals and/or objects through a space having sensors. Using machine learning, the system can correlate the timing between events and learn paths through the space. By learning the paths through the space and the correlation between the timing of events, the system can generate a model to predict the path taken through the facility and which sensors will generate events on the predicted path. The system can then apply the model to a series of tagged and untagged events to identify individuals and/or objects that have caused the untagged events in the series. In other words, the system can use the model to tag untagged events in the provided series of events. Furthermore, in certain embodiments, some tagged events can be stripped of their tags and used to test the accuracy of the model.

Figure 1B:
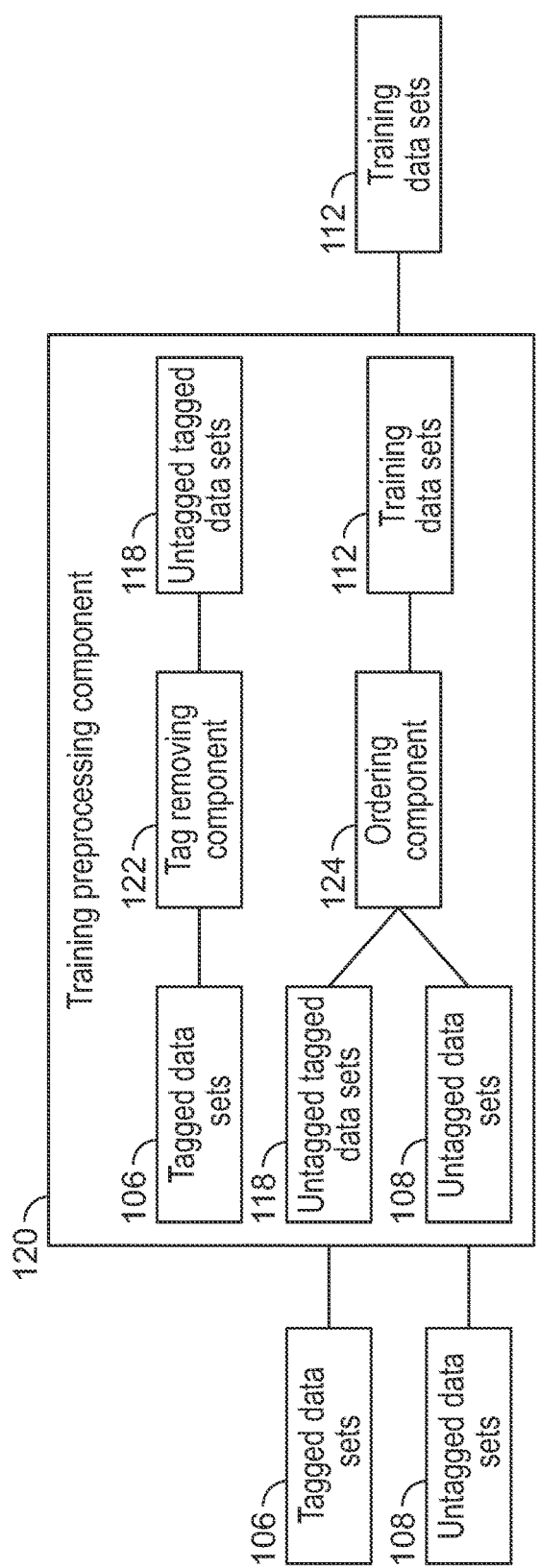
FIG. 1B depicts an example of a training preprocessing component used in the tagging system, according to certain embodiments.
Figure 1C:
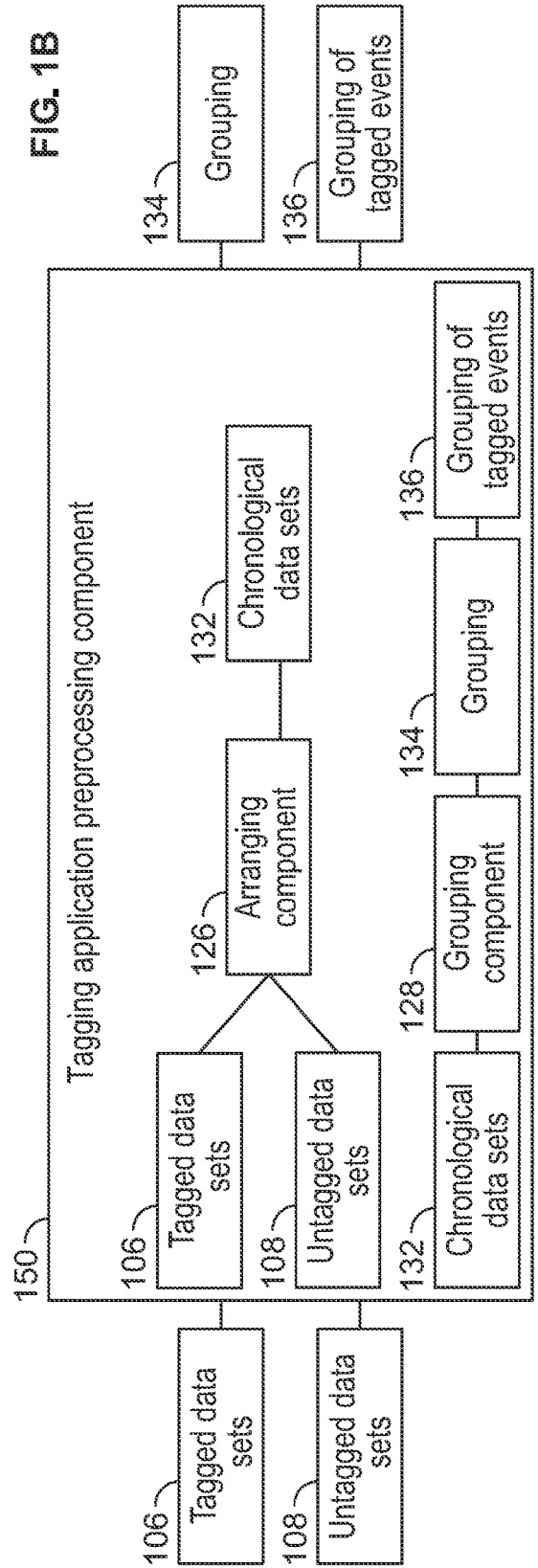
FIG. 1C depicts and example of a tagging application preprocessing component used in the tagging system, according to certain embodiments.

FIG. 1A depicts an example of a tagging system 100 for predicting events and tagging untagged events, according to certain embodiments. FIG. 1B depicts an example of a training preprocessing component 120 used in the tagging system 100, according to certain embodiments. FIG. 1C depicts an example of a tagging application preprocessing component 150 used in the tagging system 100, according to certain embodiments.

Referring to FIG. 1A, in an embodiment, the tagging system 100 may be part of a security and access control system (not shown) or may be a separate component integrated with the security and access control system or any other system that stores sensor data, and event data and/or metrics pertaining to sensor and event data. The tagging system 100 interacts with an event storage database 102 and/or a sensor system 110 to receive tagged data sets 106 (depicted in FIGS. 1B and 1C) for tagged events and untagged data sets 108 (depicted in FIGS. 1B and 1C) for untagged events which are generated by the sensors throughout the sensor system 110. The tagging system 100 includes a training preprocessing component 120 to prepare tagged data sets 106 and untagged data sets 108 as training data sets 112 for training an event prediction model, a causality modeling component 130 to train and update event prediction models to correlate the occurrence of events based on training data sets 112, a tagging application preprocessing component 150 to prepare tagged data sets 106 and untagged data sets 108 for applying the event prediction models and tagging untagged events, a tagging component 140 for tagging untagged events based on events predicted by the event prediction model, and an optional storage component 170. Each of these components will be described in greater detail below. Employees or other members of the entity utilizing the system (hereinafter users) may interact with the tagging system 100. The tagging system 100 optionally includes one or more user devices 160 useable by users for interacting with the tagging system 100. In an embodiment, the tagging system 100 may be a processor(s) or a combination of a processing system and a storage system with a software component and optional storage.

The sensor system 110 may be part of the security and access control system (not shown) or may be a separate component integrated with the security and access control system or any other company system that detects and stores event data and/or metrics pertaining to event data. The sensor system 110 comprises a plurality of sensors and systems about an area or facility. Each sensor is capable of detecting and registering situational awareness information pertaining to conditions around the sensor. When the conditions around the sensor change an event is generated. As a non-limiting example, an event for an access control sensor would be generated when an identification code is scanned or entered into the sensor. As another non-limiting example, an event for a motion detection sensor would be generated when the motion detection sensor detects motion. Another non-limiting example would include a video surveillance system identifying the movement of an object or individual. Sensors include any physical system component that gathers data or information about the physical environment around the sensor, which may include, but are not limited to, identification scanners, access control sensors, radiofrequency ID sensors, biological sensors, cameras, light sensors, motion sensors, sound sensors, thermal sensors, vibration sensors, chemical sensors, moisture sensors, pressure sensors, and combinations thereof.

An event is generated by a sensor when the information or data gathered by the sensor changes (e.g., the physical environment around the sensor changes-a motion sensor is triggered, an access control sensor is used, a video surveillance system detects movement in the video data, etc.). The sensor system 110 records and stores all events generated by the sensors in an event storage database. The sensor system 110 is also capable of transmitting events generated by the sensors in real-time to the tagging system 100.

In embodiments, an event is either a tagged event or untagged events. Tagged events are stored and transmitted by the sensor system 110 as tagged data sets 106. Untagged events are stored and transmitted by the system as untagged data sets 108. A tagged event is an event that includes data identifying the individual or object that caused the event to be generated. An untagged event is an event that does not include data identifying the individual that caused the event to be generated. Each tagged data set 106 represents a detected tagged event and includes at least, but not limited to, a sensor identification identifying the sensor generating the event, an event time, and an identification tag identifying the individual or object causing the event to be generated. Each untagged data set 108 includes, but is not limited to, a sensor identification identifying the sensor detecting the event and an event time. Untagged data sets 108 do not include an identification tag as untagged events inherently do not include the identification of the individual or object causing the event to be generated. In an embodiment, the event time is the system time within the sensor system 110 when the event is registered by the sensor system 110 or is the system time when the movement event is registered within the security and access control system or is the system time from any other system that stores event data and/or metrics pertaining to event data.

In an embodiment, each tagged data set 106 (depicted in FIGS. 1B and 1C) and each untagged data set 108 (depicted in FIGS. 1B and 1C) may be represented as a data structure including fields for all associated information and data generated by the sensor associated with the event. Such data structures for each tagged data set 106 and each untagged data set 108 comprises a data field for data indicating an instrumentality that caused the related sensor to indicate a change based on sensor function (e.g., motion for a motion sensor). In an embodiment, each tagged data set 106 and each untagged data set 108 may be represented as an object, including attributes for all associated information and data generated by the sensor associated with the event. It should be understood that these are merely examples and that any appropriate structure for associating the data collected for the tagged data sets 106 and the untagged data sets 108 may be used.

The event prediction model(s) is at least one model trained to correlate series of tagged data sets 106 and untagged data sets 108 to learn routes through the area/facility covered by the sensor system 110 and the timing between the generation of events by the sensors in the sensor system 110. Once trained, the prediction model(s) can predict expected events and correlate predicted untagged events with actual untagged events to tag the actual untagged event based on actual tagged events. It should be understood that one prediction model may be used for an entire area or facility based on all sensors or the area or facility may be broken up into multiple sectors with a prediction my for each sector or even a prediction model for each sensor.

Referring to FIG. 1B, the tagging system 100 includes a training preprocessing component 120 to receive tagged data sets 106 and untagged data sets 108. The training preprocessing component 120 may receive tagged data sets 106 and untagged data sets 108 from the event storage database 102 in batches for training or may receive tagged data sets 106 and untagged data sets 108 in real-time or near real-time directly from the sensor system 110 when the event associated with the tagged data set 106 and untagged data set 108 is generated. In an embodiment, the tagged data sets 106 and untagged data sets 108 received by the training preprocessing component 120 are all events generated by all sensors for a given period of time, such as, but not limited an hour, a day, or a month. In an embodiment, the tagged data sets 106 and untagged data sets 108 received by the training preprocessing component 120 are all events generated in a given time period and/or for a subset of given sensors and/or regions throughout the sensor system 110.

The training preprocessing component 120 performs multiple processing procedures, described further below, on the tagged data sets 106 and untagged data sets 108 to generate training data sets 112 for training the prediction model(s). In an embodiment, the training preprocessing component 120 may be a processor or a combination of a processing system and a storage system with a software component and optional storage.

In an embodiment, the training preprocessing component 120 uses a tag removing component 122 to process the received tagged data sets 106 to remove the identification tags from the tagged data sets 106. The tag removing component 122 removes data fields and/or attributes relating to identification tag data from all of the received tagged data sets. Essentially the tag removing component 122 turns all received tagged data sets 106 into untagged data sets 108.

The training preprocessing component 120 uses an ordering component 124 to generate one or more training data sets 112 from the untagged tagged data sets 118 and the untagged data sets 108. The ordering component 124 orders the untagged tagged data sets 118 and the untagged tagged data sets 118 in chronological order based on the event time for each. The training data set 112 is an ordered data structure and/or listing of all or a subset of all of the received tagged data sets 106 and untagged data sets 108. The ordering component 124 may generate a single training data set 112 for all received tagged data sets 106 and untagged data sets 108 or may break the ordered data set up into several training data sets 112 based on a time period or a given quantity of data sets to be included in each training data set 112 or in any other manner provided the ordering of the data sets is maintained. In other words, each training data set 112 is a series of tagged data sets 106 and untagged data sets 108 for a period of time with no data sets within that period of time being skipped or included in a different training data set 112. It should be understood that additional and/or different preprocessing steps may be required depending on the prediction model to be trained.

A training data set 112 is a time series sequence of untagged tagged data sets 118 and untagged data sets 108 for a period of time and for a set of sensors about a facility or area. It should be understood that the set of sensors may be all of the sensors about a facility or a subset of all of the sensors about a facility. A training data set 112 includes untagged tagged data sets 118 and untagged data sets 108 that have been processed by the training preprocessing component 120 to be in the format required by the causality modeling component 130 In an embodiment, each training data set 112 may be represented as a data structure of data structures including untagged tagged data set 118 data structures, untagged data set 108 data structures, and time period information associated with the time span that the ordered data structures cover. Accordingly, the training data sets 112 include, but are not limited to, the sensor identification and event time associated with each data set included in the training data set 112. In an embodiment, each training data set 112 may be represented as an object of objects, including untagged tagged data set 118 objects, and untagged data set 108 objects. It should be understood that these are merely examples and that any appropriate structure for associating the series of tagged data sets 106 and the untagged data sets 108 included in the training data set 112.

Referring to FIG. 1C, the tagging system 100 further may include a tagging application preprocessing component 150 that receives a request to tag untagged events by the tagging component 140 and/or processes tagged data sets 106 and untagged data sets 108 for generating predicted events by the causality modeling component 130. The tagging application preprocessing component 150 receives a request from a user device 160 or from the tagging system 100 to tag untagged events. Based on the request the tagging application preprocessing component 150 receives tagged data sets 106 and untagged data sets 108 from the event storage database 102 or in real-time or near real-time from the sensor system 110. The tagging application preprocessing component 150 performs processing procedures, described further below, on the received tagged data sets 106 and untagged data sets 108 to prepare the received data for applying the event prediction models to generate predicted events and for providing to the tagging component 140 to tag untagged events. In an embodiment, the tagging application preprocessing component 150 may be a processor or a combination of a processing system and a storage system with a software component and optional storage. It should be understood that the tagged data sets 106 and untagged data sets 108 received by the tagging application preprocessing component 150 may be any tagged data sets 106 and/or untagged data sets 108 stored in the event storage database or generated by the sensor system 110, including but not limited to the same tagged data sets 106 and untagged data sets 108 used to train the event prediction model, different tagged data sets 106 and untagged data sets from those used to train the event prediction model, and/or a combination of the same and different data sets.

In an embodiment, the request is generated based a user requesting the tagging of untagged data for a designated period of time (e.g., tag all untagged events from yesterday, from three days ago, from a specified date, date range, or time, etc.) and/or for particular individuals or objects (e.g., tag all untagged events caused by a specific identification tag), and/or for particular sensors. In an embodiment, the tagging system 100 may automatedly generate the requests for tagging untagged data based on a set of rules governing the automated tagging of untagged data. The set of rules may be based on similar parameters as the user generated requests such as a designated period of time, particular individuals or object, and particular sensors. As a non-limiting example, one such rule may be that the system automatedly generates a request hourly, daily, weekly, etc. to process and tag the untagged events for the duration or after a predetermined number of events are generated. As another non-limiting example, one such rule may be that if a tagged event is generated by a particular identification tag all untagged events generated by the same identification tag should be tagged. Another example rule may be that each time a particular sensor generates an event all events for that sensor are processed for tagging or all events generated in time after the sensor generates an event are processed for tagging. Over time, the system may learn to update or generate automated tagging rules based on an analysis of user requests for tagging untagged data. It should be understood that the above are merely examples of rules for automatic survey score prediction model generation/update requests and they should not be considered limiting.

In an embodiment, the tagging application preprocessing component 150 receives tagged data sets 106 and untagged data sets 108 based on the request from the user or the system. Based on the type of request, the tagging application preprocessing component receives all tagged data sets 106 and untagged data sets 108 needed to accomplish the requested tagging of untagged data. For example, if the request is to tag untagged events for a given period of time or duration, the tagging application preprocessing component 150 will receive all tagged data sets 106 and untagged data sets 108 for the requested time period or duration. As another example, if the request is to tag untagged events generated by a particular identification tag, the tagging application preprocessing component 150 will receive all tagged data sets 106 associated with the particular identification tag and all untagged data sets 108 generated at a time after the first tagged data set 106 through at least a time up to the last tagged data set 106 and possible for a duration after the last tagged data set 106 to also tag any untagged events caused by the particular identification tag after the last tagged data set 106 associated with the particular identification tag. The above are merely examples of the tagged data sets 106 and untagged data sets 108 that the tagging application preprocessing component 150 may receive based on the request for tagging untagged events and should not be limiting. It should be understood that the tagging application preprocessing component 150 will receive the tagged data sets 106 and untagged data sets 108 needed to comply with the request received.

The tagging application preprocessing component 150 may use an arranging component 126 to arrange the received tagged data sets 106 and the untagged data sets 108 into a set of chronological data sets 132 by ordering the tagged data sets 106 and untagged data sets 108 into chronological order according to the event time associated with each data set. The arranging component 126 may be the same component as the ordering component 124 used by the training preprocessing component 120 or may be a separate component.

The tagging application preprocessing component 150 may use a grouping component 128 to group received tagged data sets 106 with received untagged data sets 108 from the chronological data set 132. In an embodiment, the grouping component 128 groups a received tagged data set 106 with all received untagged data sets 108 from the chronological data set 132 with an event time after the event time for the tagged data set 106. In this embodiment a grouping 134 is created for each received tagged data set 106. In an embodiment, the grouping component 128 groups all received tagged data sets 106 with the same identification tag along with all received untagged data sets 108 with an event time after the event time for the initial tagged data set 106 in the grouping 134 and an event time before the final tagged data set 106 in the grouping 134. The initial tagged data set in the grouping 134 being the tagged data set 106 with the earliest event time associated with the particular identification tag and the final tagged data set 106 being the tagged data set 106 with the latest event time associated with the particular identification tag. In this embodiment a grouping 134 is created for each particular identification tag represented in the chronological data set 132.

To predict untagged events associated with each grouping 134, the tagging application preprocessing component 150 generates a grouping of tagged events 136 for each grouping 134. The grouping of tagged events 136 include all tagged data sets 106 in a grouping 134 and sends the grouping of tagged events 136 to the causality modeling component 130. Since the tagged data sets 106 in a grouping 134 are all associated with the same identification tag, the predictions generated by the causality modeling component 130 will be events predicted to be caused by the same identification tag. In other words, the event predictions generated by the causality modeling component 130 based on the grouping of tagged events 136 will be a prediction of the next sensors or next sensor the individual will encounter throughout the facility. As described in further detail below, the groupings 134 are also used by the tagging component 140 in conjunction with the event predictions generated by the trained event prediction model(s) to tag untagged events. In other words, to assign an identification tag to an untagged data set.

Referring to FIG. 1A, the tagging system 100 further includes a causality modeling component 130 to generate and train one or more event prediction models and once trained, generate predicted events. To train the event prediction model(s), the causality modeling component 130 receives training data sets 112 from the causality modeling component 130. In embodiments, based on the training data sets 112, the event prediction model(s) learns the spatial relation between sensors at the facility, the distance between neighboring sensors, and, the probability a sensor will generate an event following a previously given generated event, In other words, the event prediction model(s) learns routes between sensors through the area and/or facility and learns the correlated timing of events (tagged and untagged) generated by the sensors. The training of the event prediction model(s) will be described in further detail below. To generate predicted events, once trained, the causality modeling component 130 receives a grouping of tagged events 136 from the tagging application preprocessing component 150. In embodiments, based on the received grouping of tagged events 136, the causality modeling component 130 generates a predicted event or a series of predicted events. In other words, based on tagged events that have already happened, the causality modeling component 130 can predict a next event or a series of next events that are likely to happen. The generation of predicted events will be described in further detail below.

In an embodiment, the causality modeling component 130 trains the prediction model iteratively on one training data set 112 at a time and updates the event prediction model(s) with each training data set 112. This allows the causality modeling component 130 to adjust the weights of the prediction model(s) with each training data set 112 based on the error between the predicted timing and triggering of events and the actual timing and triggering of events. In an embodiment, the event prediction model is an unsupervised deep learning model or a statistical model. In various embodiments, the deep learning model is a bidirectional recurrent neural network (BRNN) based model such as a bidirectional long short-term memory neural network (BDL-STM) for example or a transformer-based model. In an embodiment a standard recurrent neural network (RNN) based model could also be used. In an embodiment, the statistical model is a hidden Markov based model, such as an autoregressive integrated moving average (ARIMA) model, for example. In embodiments, the model may be a supervised deep learning model, and the events generated by the sensors for the training data sets 112 are actually generated by a simulation of movement about the facility. Where training data is simulated, the events can all be tagged events, which can be used to train the prediction model(s). The simulated training data can then be used by the tagging component 140 (as will be described in further detail below) to calculate the confidence of the trained event prediction model(s).

Assuming a finite number of paths between any two sensors at a facility or area, the event prediction model uses training data sets 112 to learn movement and motion patterns throughout the area and/or location. In other words, the event prediction model learns the "locations" of the sensors throughout the facility or area and the time dependencies of generated events. The "locations" being each sensor's location relative to the other sensors' locations in the facility. For example, whether sensor A is neighbor to sensor B or if sensor C is located between sensor A and sensor B, whether there more than one path available to get between sensor A and sensor B, etc. Further, the prediction model uses training data sets 112 to learn the "distance" between the sensors in the network of sensors. The "distance" is an average time or range of time it takes for a second sensor to register after a movement event is detected at a first sensor. For example, how long will it take sensor B to generate an event after sensor A generates an event? In other words, the prediction model correlates the timing of the generation of series of events by sensors to learn the likelihood that another given sensor will generate an event after an initial event is generated by a different sensor and the timing of that generation. The greater the likelihood, the more likely one sensor is a neighbor to another sensor. The lower the likelihood, the less likely one sensor is a neighbor to another sensor.

In an embodiment, the causality modeling component 130 may develop separate prediction models for each sensor in the sensor system 110. In this embodiment, the prediction model for each sensor will model the likelihood the sensor will generate an event given an initial event or a series of events and the predicted timing of the event. In another embodiment, the causality modeling component 130 may develop one or more event prediction models for groups or regions of sensors. Any of the above embodiments may be used to predict the motion or path of an individual or object.

Once the event prediction model(s) are trained on training data sets 112, given an event or series of events, the event prediction model(s) can predict a next event and/or a series of events. If the given event or series of events include tagged events for a specific individual or object, the tagging system 100 can use the predicted events to tag untagged events. The causality modeling component 130 receives a grouping of tagged events 136 with a particular identification tag from the tagging application preprocessing component 150. Based on the grouping of tagged event 136, the causality modeling component 130 applies the trained event prediction model(s) and generates a predicted event or a series of predicted events (i.e., a prediction of which sensor will generate a next event after the sensor identification associated with an initial tagged data set 106 in the grouping of tagged events 136 or a prediction of a plurality of sensors that will generate events after the sensor identification associated with an initial tagged data set 106 and before a second sensor identification associated with a next tagged data set 106 for a particular individual or object).

In an embodiment, the event predictions generated by the event prediction model(s) include an event prediction for each sensor in the facility, an event prediction for the sensor most likely to generate the next event given an initial event and/or a series of events, an event prediction for the top five sensors most likely to generate the next event given an initial event and/or a series of events. In an embodiment, the event predictions generated by the event prediction models include a series of event predictions for each sensor in the facility, a series of event predictions for the sensor most likely to generate the next event given an initial event and/or a series of events, a series of event predictions for the top five sensors most likely to generate the next event given an initial event and/or a series of events. The series of event predictions start with a next predicted event after an initial received tagged data set 106 and continue with additional sequential predicted events until a next received tagged data set 106 is reached by the prediction model(s), until all received tagged data sets 106 are reached by the prediction model(s), or until a number of events in the series of events have been predicted. In embodiments where the event predictions generated are for each sensor in the facility or location the series of event predictions would include an event prediction for each permutation of series of events for each sensor at the location or area. In embodiments where the event predictions generated are for a most likely series of events for each sensor the series of event predictions would include the most likely permutation of series of events for each sensor. It should be understood that the above are merely examples of the types of event predictions the causality modeling component 130 may provide and the data that is included in the event predictions. These embodiments should not be considered limiting.

Each event prediction for a sensor may include the sensor identification, a probability number indicating the likelihood that a particular sensor will be the next sensor to generate an event based on the tagged data set 106 or the series of tagged data sets 106, a timing indication, and a previous sensor identification. The previous sensor identification is the sensor identification of the sensor associated with the event immediately preceding the event prediction. The timing indication provides an amount of time predicted in between the event immediately preceding the event prediction and the event predicted to be generated by the sensor. The timing indication may be a duration, a duration range, a system time after the event time for the immediately preceding event, or a system time range after the event time for the immediately preceding event. The timing indication provides a predicted time that the predicted event will occur given a sensor identification and event time for the event immediately preceding the predicted event.

Figure 5:
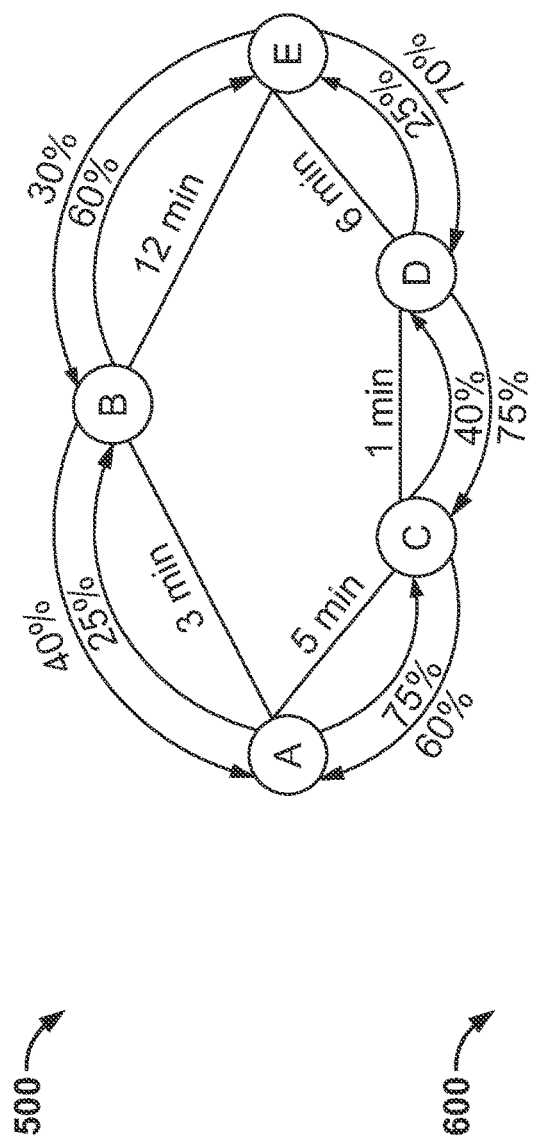
FIG. 5 depicts an example diagram of a learned sensor layout at a facility, according to certain embodiments.

FIG. 5 illustrates an example diagram 500 of a layout of sensors and learned paths throughout a facility or area with learned timing between sensors and learned probability that a particular sensor will generate an event after a preceding sensor generates an event. The learned timing between sensors is bi-directional in that the time traveling from sensor A to sensor B is the same as the time traveling from sensor B to sensor A. The learned probability is not bi-directional, but the total probability out of a particular sensor for all possible paths should be approximately 100 assuming no missed events (i.e., cannot be greater than one hundred percent). As a non-limiting example, causality modeling component 130 connected to a sensor system 110 (as depicted in FIG. 5, with five sensors: A, B, C, D, and E) may receive a request to generate predicted events for received tagged data set with a sensor identification of A and an event time of 7:00 am for the current system date. Based on the learned layout and timing of events in the facility or area (as depicted in FIG. 5) and the received tagged data set, the causality modeling component 130 will generate an event prediction for each remaining sensor in the facility as follows: the event prediction for sensor B would include a sensor identification of B, a probability number of 25, a timing indication of 3 minutes or 7:03 am, and a previous sensor identification of A; the event prediction for sensor C would include a sensor identification of C, a probability number of 75, a timing indication of 5 minutes or 7:05 am, and a previous sensor identification of A; the event prediction for sensor D would include a sensor identification of D, a probability number of 0 or null, a timing indication of 0 or null, and a previous sensor identification of A; and the event prediction for sensor E would include a sensor identification of E, a probability number of 0 or null, a timing indication of 0 or null, and a previous sensor identification of A.

As a further non-limiting example, still referring to the example above and FIG. 5, in embodiments where the causality modeling component 130 generates series of event predictions for each remaining sensor in the facility or area, the series of event predictions will include event predictions for all subsequent permutations of predicted events until an end event is reached and/or until a predetermined number of events are predicted. In embodiments that generate series of event predictions, the permutation of the series will end when the originating sensor identification of the series (e.g., the sensor identification of the received initial tagged data set 106) is predicted to be the sensor identification for the next predicted event in the series. This termination condition prevents the causality modeling component 130 from continually processing predicted events where a person or object is predicted to continually travel back and forth between two sensors and never reach a terminating sensor or where a person or object is predicted to travel in circles. Based on the continued example above, in the event prediction series of sensor A to sensor B, the causality modeling component 130 will generate a next event prediction for each remaining sensor (all sensors other than sensor B) in the facility as follows: the event prediction for sensor A would include a sensor identification of A, a probability number of 40, a timing indication of 3 minutes or 7:06 am, and a previous sensor identification of B (based on termination conditions this path of the event prediction series would end since sensor A is the originating sensor); the event prediction for sensor C would include a sensor identification of C, a probability number of 0 or null, a timing indication of 0 or null, and a previous sensor identification of B; the event prediction for sensor D would include a sensor identification of D, a probability number of 0 or null, a timing indication of 0 or null, and a previous sensor identification of B; and the event prediction for sensor E would include a sensor identification of E, a probability number of 60, a timing indication of 12 minutes or 7:15 am, and a previous sensor identification of B. Additionally in the event prediction series of sensor A to sensor C, the causality modeling component 130 will generate a next event prediction for each remaining sensor (all sensors other than sensor C) in the facility as follows: the event prediction for sensor A would include a sensor identification of A, a probability number of 60, a timing indication of 5 minutes or 7:10 am, and a previous sensor identification of C (based on termination conditions this path of the event prediction series would end since sensor A is the originating sensor); the event prediction for sensor B would include a sensor identification of B, a probability number of 0 or null, a timing indication of 0 or null, and a previous sensor identification of C; the event prediction for sensor D would include a sensor identification of D, a probability number of 40, a timing indication of 1 minute or 7:06, and a previous sensor identification of C; and the event prediction for sensor E would include a sensor identification of E, a probability number of 0 or null, a timing indication of 0 or null, and a previous sensor identification of C. As can be seen by this non-limiting example, a series of event predictions will generate a tree of event predictions based on the learned routes between sensors of a facility. Each branch of the tree will terminate once a termination condition is reached (e.g., the prediction doubles back to the originating sensor of the series, a set number of predictions in the branch have been generated, or a particular sensor identification has been reached in the prediction series).

Figure 6:
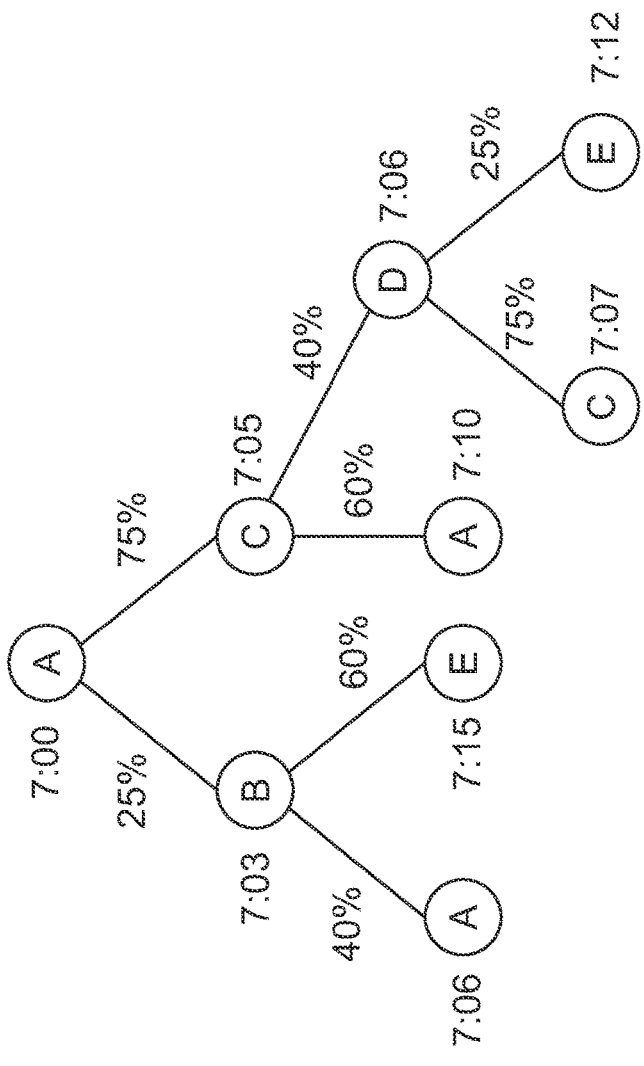
FIG. 6 depicts an example diagram of a series of predicted events, according to certain embodiments.

In an embodiment, the series of predicted events may be generated as a permutation tree with each predicted event in the series included in the tree. FIG. 6 depicts an example tree diagram 600 of a series of predicted events with each node of the tree being a predicted event with the initial tagged data set being sensor A at 7:00 am. It should be understood that the above embodiments and FIGS. 5 and 6 are merely examples of a sensor system 110 layout and of event predictions and/or event prediction series generated by the causality modeling component 130 and should not be limiting. It should further be understood that the predicted events generated for a grouping of tagged events 136 may differ from the example above. For example, the predicted events generated for a grouping of tagged events 136 may only include the predicted events that result in completion of the grouping of tagged events 136 and may exclude predicted events for other sensors. As a non-limiting example, given two sequential tagged data sets 106 for a specific identified individual the prediction model(s) can predict the route taken by the individual to travel between the two tagged events, predict the sensors triggered by the individual while traveling between the two tagged events, and predict the time and/or time range at which each sensor is triggered. In other words, the prediction model can predict what sensors will be triggered by the individual between the two tagged data sets 106 and the approximate timing and/or time range for the triggering of sensor. In an embodiment, the two sequential tagged data sets 106 for a specific identified individual include an initial tagged data set 106 for the specific identified individual and the next chronological tagged data set 106 for the same specific identified individual where there is no intervening tagged data sets 106 for the same specific identified individual.

The tagging system 100 may also include a tagging component 140 for generating tagged untagged data sets by tagging untagged events. In an embodiment, the tagging component 140 receives a grouping 134 of tagged data sets 106 and untagged data sets 108 from the tagging application preprocessing component 150 and a predicted event or series of predicted events from the causality modeling component 130. The predicted event or series of predicted events are the event predictions generated by the causality modeling component 130 for the grouping of tagged events 136 associated same grouping 134 received from the tagging application preprocessing component 150. The tagging component 140 compares the predicted events to the received untagged data sets 108 in the grouping 134 to tag untagged data sets. In an embodiment, the tagging component 140 compares each predicted event to the untagged data sets 108 in the grouping 134. If a predicted event matches an untagged data set 108 the tagging component 140 can label the untagged data set 108 as being generated by the same identification tag associated with the tagged data sets 106 included in the grouping 134. Untagged data sets 108 in the grouping 134 that do not match a predicted event do not get assigned an identification tag. Tagged untagged data sets are untagged data sets 108 that have an identification tag applied to them.

In an embodiment, to test the accuracy of the event prediction models, the untagged data sets 108 in the grouping 134 received by the tagging component 140 may actually be pre-tagged. Once the tagging component 140 assigns an identification tag to an untagged data set 108 based on the predicted events, the tagging component 140 can compare the assigned identification tag to the identification tag originally associated with the pre-tagged untagged data set 108 to determine the accuracy of the prediction models. If the accuracy of the prediction model(s) is below a threshold accuracy (e.g., below seventy-five percent, below ninety percent, below ninety-five percent, etc.) a retraining of the prediction models may be triggered.

Optionally, tagged data sets 106, untagged data sets 108, training data sets 112, untagged tagged data sets 118, event prediction models, sensor identifications, event times, identification tags, predicted events, probability numbers, timing indications, previous sensor identifications, groupings of tagged events 136, groupings 134, and tagged untagged data sets may be stored in a storage component 170 for later use. The tagging system 100 may also include a user device 160 for displaying tagged data sets 106, untagged data sets 108, training data sets 112, untagged tagged data sets 118, event prediction models, sensor identifications, event times, identification tags, predicted events, probability numbers, timing indications, previous sensor identifications, groupings of tagged events 136, groupings 134, and tagged untagged data sets and for allowing users to interact with the tagging system 100. The tagging system may further include a tagged event database for storing tagged untagged events generated by the tagging component 140.

Figure 2:
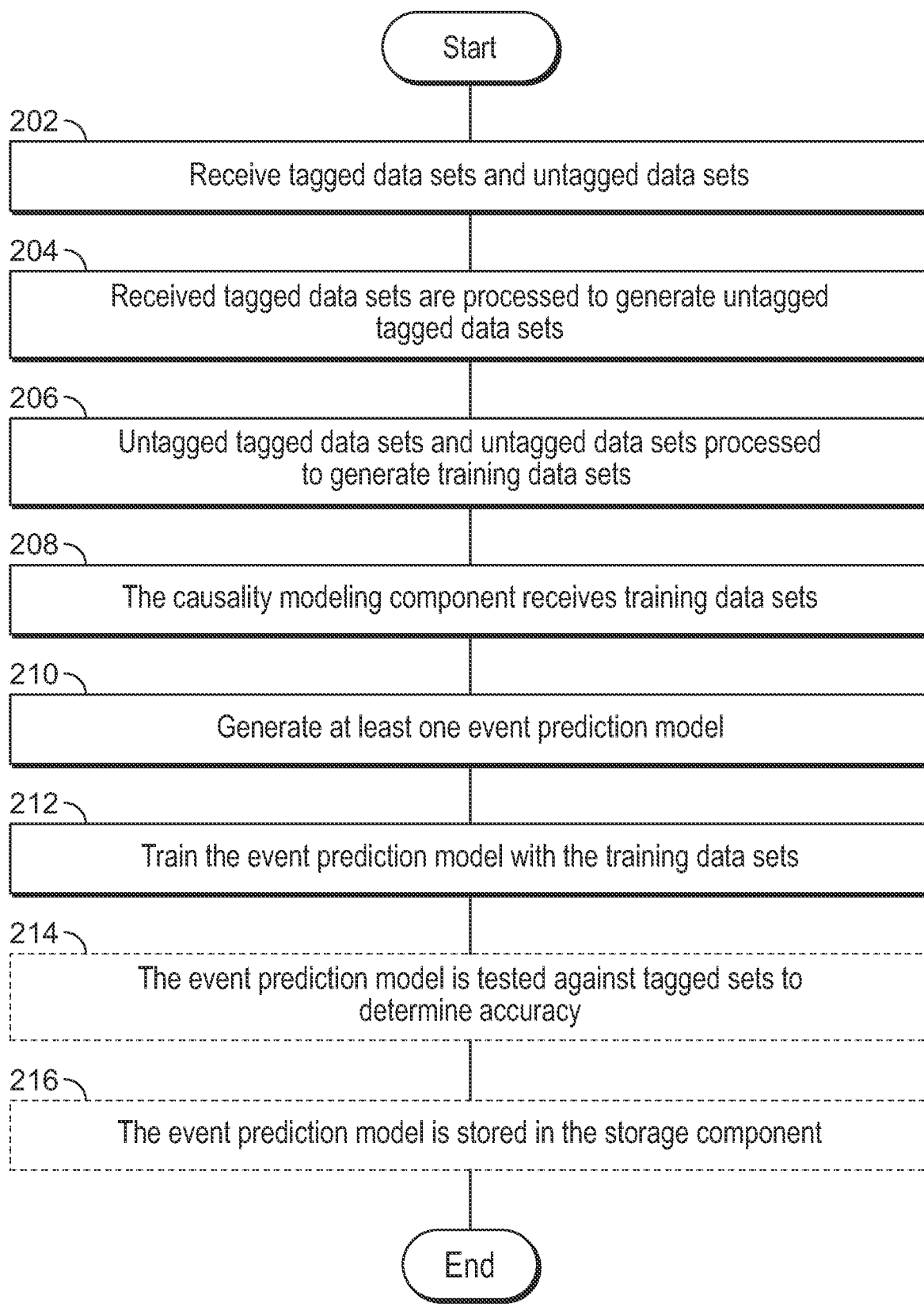
FIG. 2 depicts a flowchart of an example of a method for generating and training event prediction model(s), according to certain embodiments.

FIG. 2 depicts a flowchart of an example of a method for generating and training event prediction model(s) according to certain embodiments. Blocks 202 to 206 comprise the data processing blocks. Blocks 208 to 216 comprise the model training and generation blocks. The numbering and sequencing of the blocks are for reference only; blocks or sequences of blocks may be performed out of order or repeated.

In block 202, the tagging system 100 receives tagged data sets 106 and untagged data sets 108 at the training preprocessing component 120. In embodiments, the tagged data sets 106 and untagged data sets 108 are received from an event storage database 102 and/or directly from the sensor system 110. The received tagged data sets 106 and untagged data sets 108 are used to generate training data sets 112 to train event prediction models.

In block 204, the received tagged data sets 106 are processed by the training preprocessing component 120 using a tag removing component 122 to generate untagged tagged data sets 118. The tag removing component 122 processes each received tagged data set 106 to remove the identification tag associated with the tagged data set 106. In other words, the tag removing component 122 transforms tagged data sets into untagged data sets.

In block 206, the untagged tagged data sets 118 and the received untagged data sets 108 are processed by the training preprocessing component 120 using an ordering component 124 to generate training data sets 112. The ordering component arranges the untagged data sets 108 and the untagged tagged data sets 118 in chronological order based on the event time associated with each data set. Once in chronological order, the ordering component 124 groups the ordered untagged data sets 108 and untagged tagged data sets 118 into one or more training data sets 112. The ordering component 124 may break the ordered data sets up into several training data sets 112 based on a time period or a given quantity of data sets to be included in each training data set 112 or in any other manner provided the ordering of the data sets are maintained. In other words, each training data set 112 is a series of tagged data sets 106 and untagged data sets 108 for a period of time with no data sets within that period of time being skipped or included in a different training data set 112.

In block 208 the causality modeling component 130 receives the training data sets 112 from the training preprocessing component 120.

In block 210 the causality modeling component 130 generates at least one event prediction model. In an embodiment, the causality modeling component 130 is an unsupervised deep learning model or a statistical model. In various embodiments, the deep learning model is a bidirectional recurrent neural network (BRNN) based model such as a bidirectional long short-term memory neural network (BDLSTM) for example or a transformer-based model. In an embodiment a standard recurrent neural network (RNN) based model could also be used. In an embodiment, the statistical model is a hidden Markov based model, such as an autoregressive integrated moving average (ARIMA) model, for example.

In block 212, the causality model component 130 trains the event prediction model(s) with the training data sets 112. The event prediction model(s) learn the causality between the occurrence of event. Causality is based on the occurrence of event in relation to other events occurring both before and after the even and a learned spatial relationship between sensors.

Optionally, in block 214, the event prediction model is tested against tagged sets to determine accuracy. In embodiments, blocks 212 and 214 may be repeated to continue to refine the event prediction model. Once the error in the event prediction model is sufficiently small (e.g., 85% accurate, 90% accurate, 95% accurate, etc.), the event prediction model can be used to predict events occurring after a given event. The training process can be continually and/or periodically updated with more tagged and/or untagged data sets. This can serve to refine and increase the event prediction model's ability to make predictions.

Optionally, in block 216, the event prediction model(s) are stored in the storage component 170 for later use.

Figure 3:
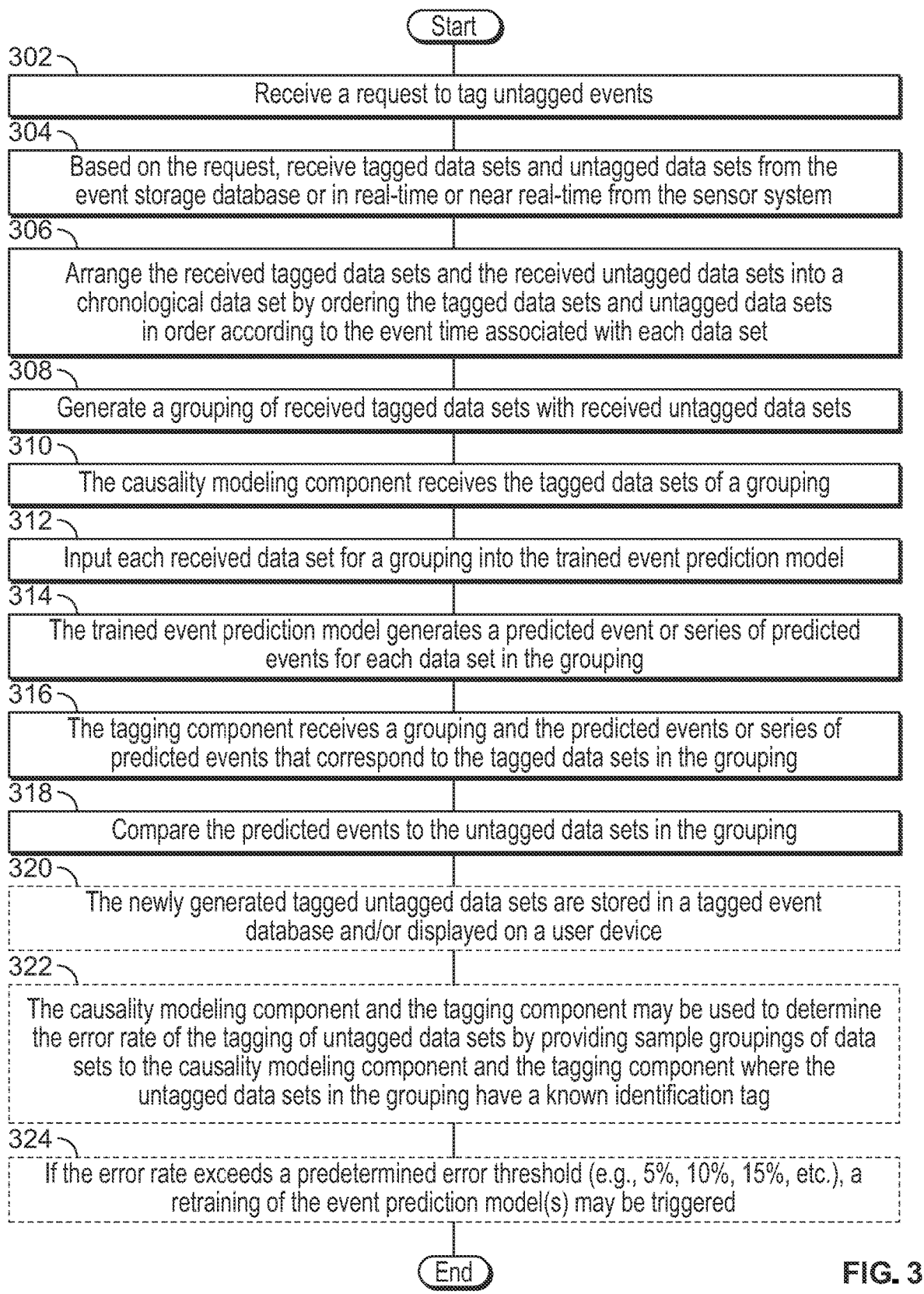
FIG. 3 depicts a flowchart of an example of a method for tagging untagged events in a security management system using event prediction model(s), according to certain embodiments.

FIG. 3 depicts a flowchart of an example of a method for tagging untagged events in a security management system using event prediction model(s), according to certain embodiments. The numbering and sequencing of the blocks are for reference only; blocks or sequences of blocks may be performed out of order or repeated.

In block 302, the tagging system 100 receives a request to tag untagged events at the tagging application preprocessing component 150. In an embodiment, the request is generated based a user requesting the tagging of untagged data for a designated period of time (e.g., tag all untagged events from yesterday, from three days ago, from a specified date, date range, or time, etc.) and/or for particular individuals or objects (e.g., tag all untagged events caused by a specific identification tag), and/or for particular sensors. In an embodiment, the tagging system 100 may automatedly generate the requests for tagging untagged data based on a set of rules governing the automated tagging of untagged data.

In block 304, based on the request, the tagging application preprocessing component 150 receives tagged data sets 106 and untagged data sets 108 from the event storage database 102 or in real-time or near real-time from the sensor system 110. Based on the type of request, the tagging application preprocessing component receives all tagged data sets 106 and untagged data sets 108 needed to accomplish the requested tagging of untagged data.

In block 306, the tagging application preprocessing component 150 uses an arranging component 126 to arrange the received tagged data sets 106 and the received untagged data sets 108 into a chronological data set 132 by ordering the tagged data sets 106 and untagged data sets 108 in order according to the event time associated with each data set.

In block 308, the tagging application preprocessing component 150 uses a grouping component 128 to generate a grouping 134 of received tagged data sets 106 with received untagged data sets 108. The grouping 134 is used to generate predicted events by the causality modeling component 130 and for tagging untagged data sets by the tagging component 140. In an embodiment, each grouping 134 will start with a received tagged data set 106 associated with a specific identification tag and include subsequent received untagged data sets 108 and/or subsequent received tagged data sets 106 associated with the same specific identification tag. In an embodiment, the grouping component 128 groups a received tagged data set 106 with all received untagged data sets 108 with an event time after the event time for the tagged data set 106. In this embodiment a grouping 134 is created for each received tagged data set 106. In an embodiment, the grouping component 128 generates a grouping 134 of all received tagged data sets 106 with the same identification tag along with all received untagged data sets 108 with an event time after the event time for the initial tagged data set 106 in the grouping 134 and an event time before the final tagged data set 106 in the grouping 134. The initial tagged date set in the grouping 134 being the tagged data set 106 with the earliest event time associated with the particular identification tag and the final tagged data set 106 being the tagged data set 106 with the latest event time associated with the particular identification tag. In this embodiment a grouping 134 is created for each particular identification tag represented in the received tagged data sets 106. In an embodiment, it is possible that the initial data set in a grouping 134 is an untagged data set 108 followed by subsequent tagged data sets 106 and untagged data sets 108. In embodiments, the trained event prediction model can generate predicted events occurring prior to the given event or event series for prediction.

In block 310, the causality modeling component 130 receives the tagged data sets 106 (and in some embodiments the untagged data sets 108) for a grouping 134 from the tagging application preprocessing component 150.

In block 312, the causality modeling component 130 inputs each received data set for a grouping 134 into the trained event prediction model.

In block 314, the trained event prediction model generates a predicted event or series of predicted events for each data set in the grouping 134. In an embodiment, the predicted events or series of predicted events include the identification tag associated with the data set for which the prediction model is generating the predicted events.

In block 316, the tagging component 140 receives a grouping 134 from the tagging application preprocessing component 150 and the predicted events or series of predicted events that correspond to the tagged data sets in the grouping 134 from the causality modeling component 130 to tag the untagged data sets 108 in the grouping.

In block 318, the tagging component 140 compares the predicted events to the untagged data sets 108 in the grouping 134. If a predicted event matches an untagged data set 108, the tagging component 140 will assign the identification tag associated with the predicted event to the untagged data set 108, thereby making the untagged data set 108 a tagged untagged data set.

In optional block 320, the newly generated tagged untagged data sets are stored in a tagged event database 104 and/or displayed on a user device 160.

Optionally, in block 322, the causality modeling component 130 and the tagging component 140 may be used to determine the error rate of the tagging of untagged data sets by providing sample groupings 134 of data sets to the causality modeling component 130 and the tagging component where the untagged data sets 108 in the grouping 134 have a known identification tag. After the tagging component 140 generates the tagged untagged data sets, the identification tag assigned by the tagging component 140 is compared to the known identification tag associated with the sample untagged data sets 108 to generate an error rate for the tagging component 140.

Optionally, in block 324, if the error rate exceeds a predetermined error threshold (e.g., 5%, 10%, 15%, etc.), a retraining of the event prediction model(s) may be triggered.

Figure 4A:
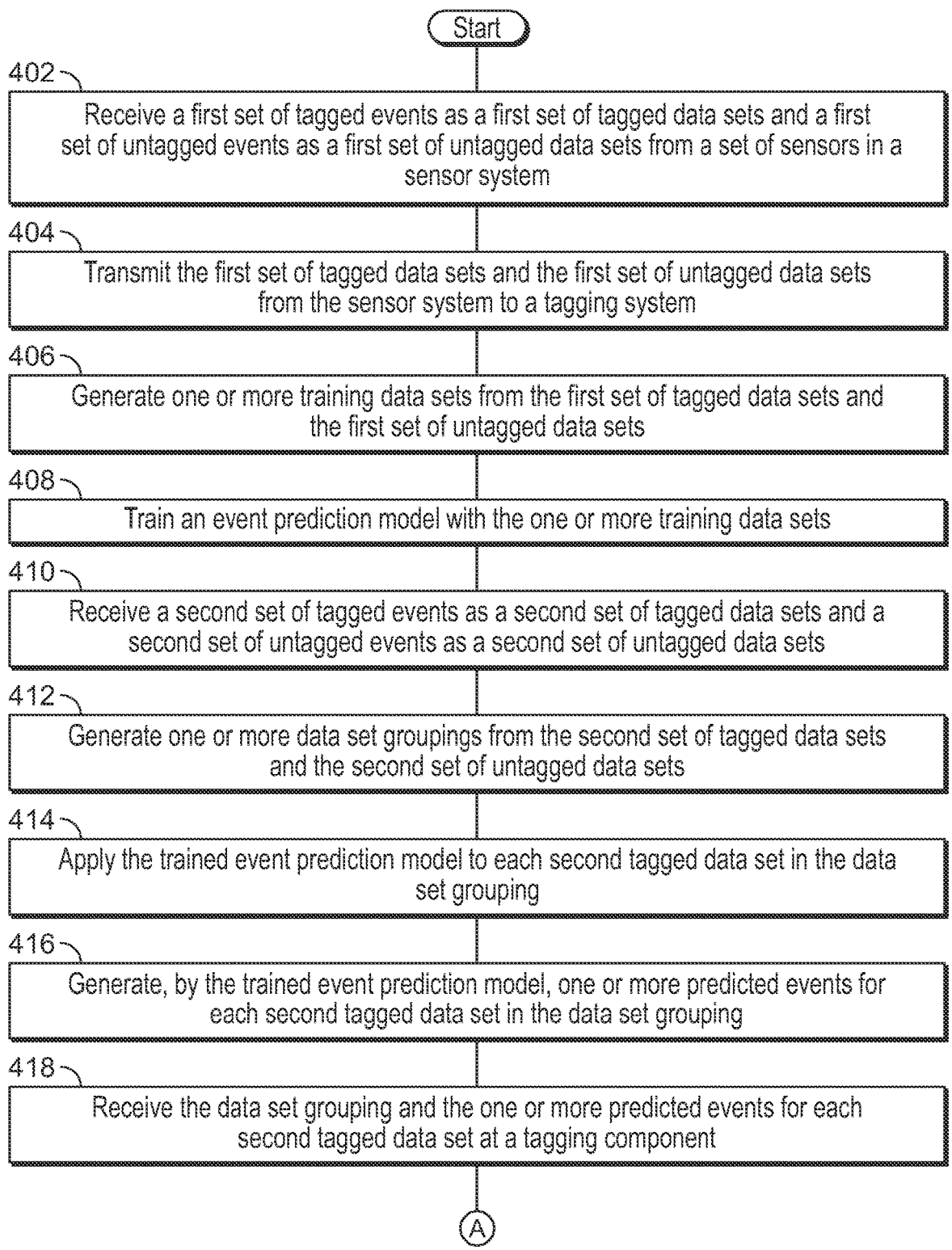
FIGS. 4A and 4B depict a flowchart of an example of a method for tagging untagged events in a security management system using event prediction model(s), according to certain embodiments.
Figure 4B:
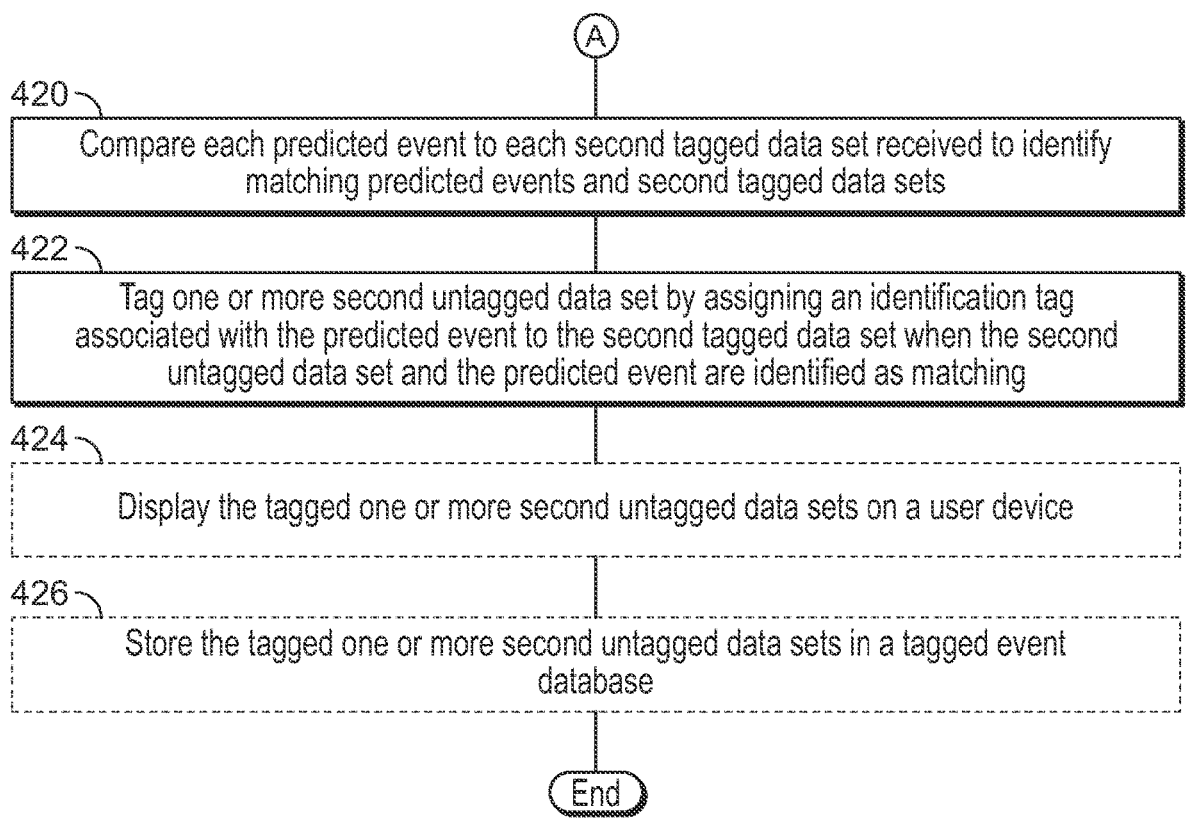

FIGS. 4A and 4B depict a flowchart of an example of a method for tagging untagged events in a security management system using event prediction model(s), according to certain embodiments. The numbering and sequencing of the blocks are for reference only; blocks or sequences of blocks may be performed out of order or repeated.

In block 402, the sensor system 110 receives a first set of tagged events as a first set of tagged data sets 106 and a first set untagged events as a first set of untagged data sets 108 from a set of sensors in a sensor system 110.

In block 404, transmit the first set of tagged data sets 106 and the first set of untagged data sets 108 to a training preprocessing component 120 in a tagging system 100.

In block 406, the training preprocessing component 120 generates one or more training data sets 112 from the first set of tagged data sets 106 and the first set of untagged data sets 108.

In block 408, the causality modeling component 130 trains the event prediction model(s) with the one or more training data sets 112.

In block 410, a tagging application preprocessing component 150 receives a second set of tagged events as a second set of tagged data sets 106 and a second set of untagged events as a second set of untagged data sets 108. In an embodiment, the second set of tagged events and second set of untagged events are associated with a specified time period. It should be understood that the second set of untagged data sets and the second set of tagged data sets may be the same or different data sets as those used to train the event prediction model(s). In an embodiment, the second set of tagged events and the second set of untagged events are received based on a request for the tagging of untagged data. In an embodiment, the request is for a designated period of time (e.g., tag all untagged events from yesterday, from three days ago, from a specified date, date range, or time, etc.) and/or for particular individuals or objects (e.g., tag all untagged events caused by a specific identification tag), and/or for particular sensors. In an embodiment, the tagging system 100 may automatedly generate the requests for tagging untagged data based on a set of rules governing the automated tagging of untagged data as described further herein. In an embodiment, the tagging application preprocessing component 150 receives second tagged data sets 106 and second untagged data sets 108 based on the request from the user or the system. Based on the type of request, the tagging application preprocessing component receives all tagged data sets 106 and untagged data sets 108 needed to accomplish the requested tagging of untagged data as described further herein.

In block 412, the tagging application preprocessing component 150 generates one or more data set groupings from the second set of tagged data sets 106 and the second set of untagged data sets 108 for forecasting predicted events and for tagging untagged data sets in the second tagged data sets.

In block 414, the causality modeling component 130, applies the trained event prediction model to each second tagged data set in the data set grouping.

In block 416, generating, by the trained event prediction model, one or more predicted events for each second tagged data set in the data set grouping.

In block 418, receiving the data set grouping and the one or more predicted events for each second tagged data set at a tagging component 140. The second tagged data sets in the data set grouping correspond to the second tagged data sets used by the causality modeling component 130 to generate the predicted events.

In block 420, the tagging component 140 compares each predicted event to each second tagged data set received to identify matching predicted events and second tagged data sets.

In block 422, the tagging component 140 tags one or more second untagged data set by assigning an identification tag associated with the predicted event for the second tagged data set when the second untagged data set and the predicted event are identified as matching.

In optional block 424, the tagging component 140 displays the tagged one or more second untagged data sets on a user device 160.

In optional block 426, the tagging component 140 stores the tagged one or more second untagged data sets in a tagged event database 104.

Figure 7:
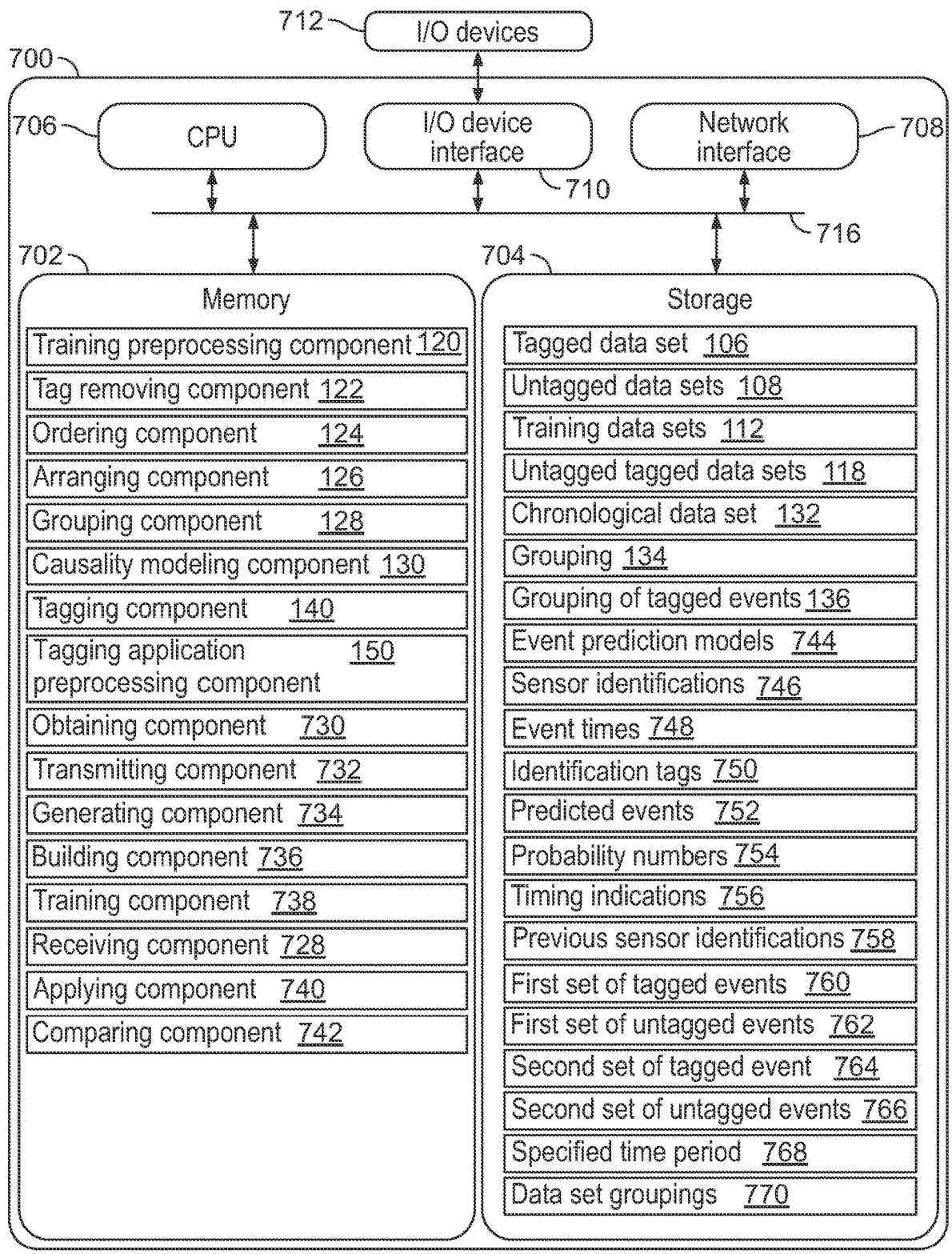
FIG. 7 depicts an example diagram of a computer system that may be utilized to implement tagging untagged events in accordance with the disclosure, according to certain embodiments It should be understood that for clarity, not every part is necessarily labeled in every drawing. Lack of labeling should not be interpreted as a lack of disclosure.

FIG. 7 depicts an example diagram of a computer system 700 that may include the kinds of software programs, data stores, hardware, and interfaces that can implement a tagging system 100 as disclosed herein and according to certain embodiments. The computing system 700 may be used to implement embodiments of portions of the tagging system 100 or in carrying out embodiments of method 200, method 300, and/or method 400. The computing system 700 may be part of or connected to an overarching customer service center system.

As shown, the computer system 700 includes, without limitation, a memory 702, a storage 704, a central processing unit (CPU) 706, and a network interface 708, each connected to a bus 716. The computing system 700 may also include an input/output (I/O) device interface 710 connecting I/O devices 712 (e.g., keyboard, display, and mouse devices) and/or a network interface 708 to the computing system 700. Further, the computing elements shown in computer system 700 may correspond to a physical computing system (e.g., a system in a data center), a virtual computing instance executing within a computing cloud, and/or several physical computing systems located in several physical locations connected through any combination of networks and/or computing clouds.

Computing system 700 is a specialized system specifically designed to perform the steps and actions necessary to execute methods 200, 300, and 400 and tagging system 100. While some of the component options for computing system 700 may include components prevalent in other computing systems, computing system 700 is a specialized computing system specifically capable of performing the steps and processes described herein.

The CPU 706 retrieves, loads, and executes programming instructions stored in memory 702. The bus 716 is used to transmit programming instructions and application data between the CPU 706, I/O interface 710, network interface 708, and memory 702. Note, the CPU 706 can comprise a microprocessor and other circuitry that retrieves and executes programming instructions from memory 702. CPU 706 can be implemented within a single processing element (which may include multiple processing cores) but can also be distributed across multiple processing elements (with or without multiple processing cores) or sub-systems that cooperate in existing program instructions. Examples of CPUs 706 include central processing units, application-specific processors, and logic devices, as well as any other type of processing device, a combination of processing devices, or variations thereof. While there are a number of processing devices available to compromise the CPU 706, the processing devices used for the CPU 706 are particular to this system and are specifically capable of performing the processing necessary to execute methods 200, 300, and 400 and tagging system 100.

The memory 702 can comprise any memory media readable by CPU 706 that is capable of storing programming instructions and able to meet the needs of the computing system 700 and execute the programming instructions required for methods 200, 300, and 400 and tagging system 100. Memory 702 is generally included to be representative of a random-access memory. In addition, memory 702 may include volatile and non-volatile, removable, and non-removable media implemented in any method or technology for storage of information, such as computer-readable instructions or program components. The memory 702 may be implemented as a single memory device but may also be implemented across multiple memory devices or sub-systems. The memory 702 can further include additional elements, such as a controller capable of communicating with the CPU 706.

Illustratively, the memory includes multiple sets of programming instructions for performing the functions of the tagging system 100 and methods 200, 300, and 400, including, but not limited to, training preprocessing component 120, tag removing component 122, ordering component 124, arranging component 126, grouping component 128, causality modeling component 130, tagging component 140, and tagging application preprocessing component 150, all of which are discussed in greater detail herein. Illustratively, the memory may also include an obtaining component 730, a transmitting component 732, a generating component 734, a building component 736, a training component 738, a receiving component 728, an applying component 740, and a comparing component 742. Although memory 702, as depicted in FIG. 7 includes eleven sets of programming instruction components in the present example, it should be understood that one or more components could perform single- or multi-component functions. It is also contemplated that these components of computing system 700 may be operating in a number of physical locations.

The storage 704 can comprise any storage media readable by CPU 706 and is capable of storing data that is able to meet the needs of computing system 700 and store the data required for methods 200, 300, and 400 and tagging system 100. The storage 704 may be a disk drive or flash storage device. The storage 704 may include volatile and non-volatile, removable, and non-removable media implemented in any method or technology for storage of information. Although shown as a single unit, the storage 704 may be a combination of fixed and/or removable storage devices, such as fixed disc drives, removable memory cards, optical storage, network-attached storage (NAS), or a storage area-network (SAN). The storage 704 can further include additional elements, such as a controller capable of communicating with the CPU 706.

Illustratively, the storage 704 may store data such as but not limited to tagged data sets 106, untagged data sets 108, training data sets 112, untagged tagged data sets 118, chronological data sets 132, groupings 134, groupings of tagged events 136, event prediction models 744, sensor identifications 746, event times 748, identification tags 750, predicted events 752, probability numbers 754, timing indications 756, and previous sensor identifications 758, all of which are also discussed in greater detail herein. Illustratively, the storage 704 may also store data such as but not limited to a first set of tagged events 760, a first set of untagged events 762, a second set of tagged events 764, a second set of untagged events 766, a specified time period 768, and data set groupings 770.

Examples of memory and storage media include random access memory, read-only memory, magnetic discs, optical discs, flash memory, virtual memory, and non-virtual memory, magnetic sets, magnetic tape, magnetic disc storage, or other magnetic storage devices, or any other medium which can be used to store the desired software components or information that may be accessed by an instruction execution system, as well as any combination or variation thereof, or any other type of storage medium. In some implementations, one or both of the memory and storage media can be a non-transitory memory and storage media. In some implementations, at least a portion of the memory and storage media may be transitory. Memory and storage media may be incorporated into computing system 700. While many types of memory and storage media may be incorporated into computing system 700, the memory and storage media used is capable of executing the storage requirements of methods 200, 300, and 400 and tagging system 100 as described herein.

The I/O interface 710 allows computing system 700 to interface with I/O devices 712. I/O devices 712 can include one or more user devices 160, sensor systems 110, graphical user interfaces, desktops, a mouse, a keyboard, a voice input device, a touch input device for receiving a gesture from a user, a motion input device for detecting non-touch gestures and other motions by a user, and other comparable I/O devices and associated processing elements capable of receiving input. The I/O devices 712 through the user devices 160 are also integrated into the system allowing users to access the sensor system 110, the security management system, telephone system, internet system, and a text communications system, among other systems. I/O devices 712 can also include devices such as a video display or graphical display and other comparable I/O devices and associated processing elements capable of providing output. Speakers, printers, haptic devices, or other types of output devices may also be included in the I/O device 712.

A user can communicate with computing system 700 through the I/O device 712 in order to view tagged data sets 106, untagged data sets 108, training data sets 112, untagged tagged data sets 118, chronological data sets 132, groupings 134, groupings of tagged events 136, event prediction models 744, sensor identifications 746, event times 748, identification tags 750, predicted events 752, probability numbers 754, timing indications 756, previous sensor identifications 758, a first set of tagged events 760, a first set of untagged events 762, a second set of tagged events 764, a second set of untagged events 766, a specified time period 768, and data set groupings 770 or complete any number of other tasks the user may want to complete with computing system 700. I/O devices 712 can receive and output data such as but not limited to tagged data sets 106, untagged data sets 108, training data sets 112, untagged tagged data sets 118, chronological data sets 132, groupings 134, groupings of tagged events 136, event prediction models 744, sensor identifications 746, event times 748, identification tags 750, predicted events 752, probability numbers 754, timing indications 756, previous sensor identifications 758, a first set of tagged events 760, a first set of untagged events 762, a second set of tagged events 764, a second set of untagged events 766, a specified time period 768, and data set groupings 770.

As described in further detail herein, computing system 700 may receive and transmit data from and to the network interface 708. In embodiments, the network interface 708 operates to send and/or receive data, such as but not limited to, tagged data sets 106, untagged data sets 108, training data sets 112, untagged tagged data sets 118, chronological data sets 132, groupings 134, groupings of tagged events 136, event prediction models 744, sensor identifications 746, event times 748, identification tags 750, predicted events 752, probability numbers 754, timing indications 756, previous sensor identifications 758, a first set of tagged events 760, a first set of untagged events 762, a second set of tagged events 764, a second set of untagged events 766, a specified time period 768, and data set groupings 770 to/from other devices and/or systems to which computing system 700 is communicatively connected, and to receive and process interactions as described in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the foregoing description.

What is claimed is:

1. A method for tagging untagged events, comprising:
receiving a first set of tagged events as a first set of tagged data sets and a second set untagged events as a first set of untagged data sets from a set of sensors in a sensor system;
transmitting the first set of tagged data sets and the first set of untagged data sets from the sensor system to a tagging system;
generating, by a training preprocessing component, one or more training data sets from the first set of tagged data sets and the first set of untagged data sets;
training, by a causality modeling component, an event prediction model with the one or more training data sets;
receiving a second set of tagged events as a second set of tagged data sets and a second set of untagged events as a second set of untagged data sets at a tagging application preprocessing component;
generating, by the tagging application preprocessing component, one or more data set groupings from the second set of tagged data sets and the second set of untagged data sets;
applying, by the causality modeling component, the trained event prediction model to each second tagged data set in the data set grouping;
generating, by the trained event prediction model, one or more predicted events for each second tagged data set in the data set grouping;
receiving the data set grouping and the one or more predicted events for each second tagged data set at a tagging component;
comparing, by the tagging component, each predicted event to each second tagged data set received to identify matching predicted events and second tagged data sets; and
tagging one or more second untagged data set by assigning an identification tag associated with the predicted event to the second tagged data set when the second untagged data set and the predicted event are identified as matching.

2. The method of claim 1, wherein each tagged data set is a data structure including fields for a sensor identification, an event time, and an identification tag.

3. The method of claim 2, wherein generating one or more training data sets comprises:
removing the identification tag from each tagged data set in the first set of tagged data sets;
ordering the first set of untagged data sets and the first set of tagged data sets by the event time associated with each tagged data set and an event time associated with each untagged data set; and
grouping the ordered first set of untagged data sets and first set of tagged data sets into training data sets.

4. The method of claim 1, wherein the event prediction model is one of an unsupervised deep learning model, a statistical model, or a supervised deep learning model.

5. The method of claim 1, wherein each of the tagged data sets in the second set of tagged data sets include a same identification tag associated with each tagged data set.

6. The method of claim 5, wherein generating one or more data set groupings comprises:
ordering each tagged data set from the second set of tagged data sets and each untagged data set from the second set of untagged data sets based on an event time associated with each tagged data set and each untagged data set; and
grouping a first tagged data set from the ordered data sets with all subsequent untagged data sets from the ordered data sets with associated event times between the event time associated with the first tagged data set and the event time associated with a second tagged data set from the ordered data sets to generate a first data set grouping.

7. The method of claim 6, wherein generating one or more data set groupings further comprises repeating grouping each subsequent tagged data set from the ordered data sets with all subsequent untagged data sets from the ordered data sets with associated event times between the event time associated with the subsequent tagged data set and the event time associated with a next tagged data set from the ordered data sets to generate a next data set grouping for each subsequent tagged data set.

8. A system for tagging untagged events, comprising:
a memory comprising computer readable instructions;
a processor configured to read the computer readable instructions that when executed causes the system to:
receive a first set of tagged events as a first set of tagged data sets and a second set untagged events as a first set of untagged data sets from a set of sensors in a sensor system;
transmit the first set of tagged data sets and the first set of untagged data sets from the sensor system to a tagging system;
generate, by a training preprocessing component, one or more training data sets from the first set of tagged data sets and the first set of untagged data sets;
train, by a causality modeling component, an event prediction model with the one or more training data sets;
receive a second set of tagged events as a second set of tagged data sets and a second set of untagged events as a second set of untagged data sets at a tagging application preprocessing component;
generate, by the tagging application preprocessing component, one or more data set groupings from the second set of tagged data sets and the second set of untagged data sets;
apply, by the causality modeling component, the trained event prediction model to each second tagged data set in the data set grouping;
generate, by the trained event prediction model, one or more predicted events for each second tagged data set in the data set grouping;
receive the data set grouping and the one or more predicted events for each second tagged data set at a tagging component;
compare, by the tagging component, each predicted event to each second tagged data set received to identify matching predicted events and second tagged data sets; and
tag one or more second untagged data set by assigning an identification tag associated with the predicted event to the second tagged data set when the second untagged data set and the predicted event are identified as matching.

9. The system of claim 8, wherein each tagged data set is a data structure including fields for a sensor identification, an event time, and an identification tag.

10. The system of claim 9, wherein generating one or more training data sets includes computer readable instructions that further cause the system to:

remove the identification tag from each tagged data set in the first set of tagged data sets;

order the first set of untagged data sets and the first set of tagged data sets by the event time associated with each tagged data set and an event time associated with each untagged data set; and group the ordered first set of untagged data sets and first set of tagged data sets into training data sets.

11. The system of claim 8, wherein the event prediction model is one of an unsupervised deep learning model, a statistical model, or a supervised deep learning model.

12. The system of claim 8, wherein each of the tagged data sets in the second set of tagged data sets include a same identification tag associated with each tagged data set.

13. The system of claim 12, wherein generating one or more data set groupings includes computer readable instructions that further cause the system to:

order each tagged data set from the second set of tagged data sets and each untagged data set from the second set of untagged data sets based on an event time associated with each tagged data set and each untagged data set; and group a first tagged data set from the ordered data sets with all subsequent untagged data sets from the ordered data sets with associated event times between the event time associated with the first tagged data set and the event time associated with a second tagged data set from the ordered data sets to generate a first data set grouping.

14. The system of claim 13, wherein generating one or more data set groupings further includes computer readable instructions that further cause the system to repeat grouping each subsequent tagged data set from the ordered data sets with all subsequent untagged data sets from the ordered data sets with associated event times between the event time associated with the subsequent tagged data set and the event time associated with a next tagged data set from the ordered data sets to generate a next data set grouping for each subsequent tagged data set.

15. A non-transitory computer readable medium comprising computer readable code to tag untagged events on a system that when executed by a processor, causes the system to:

receive a first set of tagged events as a first set of tagged data sets and a second set untagged events as a first set of untagged data sets from a set of sensors in a sensor system;

transmit the first set of tagged data sets and the first set of untagged data sets from the sensor system to a tagging system;

generate, by a training preprocessing component, one or more training data sets from the first set of tagged data sets and the first set of untagged data sets;

train, by a causality modeling component, an event prediction model with the one or more training data sets;

receive a second set of tagged events as a second set of tagged data sets and a second set of untagged events as a second set of untagged data sets at a tagging application preprocessing component;

generate, by the tagging application preprocessing component, one or more data set groupings from the second set of tagged data sets and the second set of untagged data sets;

apply, by the causality modeling component, the trained event prediction model to each second tagged data set in the data set grouping;

generate, by the trained event prediction model, one or more predicted events for each second tagged data set in the data set grouping;

receive the data set grouping and the one or more predicted events for each second tagged data set at a tagging component;

compare, by the tagging component, each predicted event to each second tagged data set received to identify matching predicted events and second tagged data sets; and tag one or more second untagged data set by assigning an identification tag associated with the predicted event to the second tagged data set when the second untagged data set and the predicted event are identified as matching.

16. The non-transitory computer readable medium of claim 15, wherein each tagged data set is a data structure including fields for a sensor identification, an event time, and an identification tag.

17. The non-transitory computer readable medium of claim 16, wherein generating one or more training data sets includes causing the system to:

remove the identification tag from each tagged data set in the first set of tagged data sets;

order the first set of untagged data sets and the first set of tagged data sets by the event time associated with each tagged data set and an event time associated with each untagged data set; and group the ordered first set of untagged data sets and first set of tagged data sets into training data sets.

18. The non-transitory computer readable medium of claim 15, wherein the event prediction model is one of an unsupervised deep learning model, a statistical model, or a supervised deep learning model.

19. The non-transitory computer readable medium of claim 15, wherein each of the tagged data sets in the second set of tagged data sets include a same identification tag associated with each tagged data set.

20. The non-transitory computer readable medium of claim 19, wherein generating one or more data set groupings includes causing the system to:

order each tagged data set from the second set of tagged data sets and each untagged data set from the second set of untagged data sets based on an event time associated with each tagged data set and each untagged data set; and group a first tagged data set from the ordered data sets with all subsequent untagged data sets from the ordered data sets with associated event times between the event time associated with the first tagged data set and the event time associated with a second tagged data set from the ordered data sets to generate a first data set grouping.

* * * * *